United States Patent [19]

Kiya

[11] Patent Number: 4,794,541

[45] Date of Patent: Dec. 27, 1988

[54] NUMERICAL CONTROL METHOD

[75] Inventor: Nobuyuki Kiya, Hachioji, Japan

[73] Assignee: Fanuc Ltd., Tokyo, Japan

[21] Appl. No.: 804,649

[22] PCT Filed: Apr. 16, 1985

[86] PCT No.: PCT/JP85/00206

§ 371 Date: Nov. 18, 1985

§ 102(e) Date: Nov. 18, 1985

[87] PCT Pub. No.: WO85/04964

PCT Pub. Date: Nov. 7, 1985

[30] Foreign Application Priority Data

Apr. 26, 1984 [JP] Japan .................... 59-084634

[51] Int. Cl.[4] ............................................. G05B 19/403
[52] U.S. Cl. ............................. 364/474.01; 364/200
[58] Field of Search ........ 364/167, 171, 900 MS File, 364/200 MS File, 168, 169, 170, 474, 475

[56] References Cited

U.S. PATENT DOCUMENTS

| | | |
|---|---|---|
| 3,525,080 | 8/1970 | Couleur et al. ................. 364/200 |
| 3,525,081 | 8/1970 | Flemming, Jr. et al. ........ 364/200 |
| 3,548,381 | 12/1970 | Dirks ............................. 364/900 |
| 3,573,737 | 4/1971 | Rosenberg ..................... 364/167 |
| 3,609,665 | 9/1971 | Kronies ......................... 364/200 |
| 3,909,797 | 9/1975 | Goss et al. ..................... 364/200 |
| 3,938,097 | 2/1976 | Niguette, III .................. 364/200 |
| 3,949,378 | 4/1976 | Crabb et al. ................... 364/200 |
| 3,987,419 | 10/1976 | Morrill et al. ................. 364/200 |
| 4,060,851 | 11/1977 | Nakatsukasa et al. ......... 364/167 |
| 4,161,024 | 7/1979 | Joyce et al. .................... 364/200 |
| 4,399,503 | 8/1983 | Hawley .......................... 364/200 |
| 4,424,564 | 1/1984 | Hinai ............................. 364/200 |
| 4,430,701 | 2/1984 | Christian et al. .............. 364/200 |
| 4,481,568 | 11/1984 | Inaba et al. .................... 364/167 |
| 4,481,573 | 11/1984 | Fukunaga et al. .............. 364/200 |
| 4,511,982 | 4/1985 | Kurakake ....................... 364/167 |
| 4,519,026 | 5/1985 | Nozawa et al. ................ 364/167 |
| 4,591,968 | 5/1986 | Nozawa et al. ................ 364/167 |
| 4,595,989 | 6/1986 | Yasukawa et al. ............. 364/513 |
| 4,628,442 | 12/1986 | Isobe et al. .................... 364/167 |
| 4,646,247 | 2/1987 | Otsuki ............................ 364/171 |

FOREIGN PATENT DOCUMENTS 516294 2/1980 Japan .
55-24607 6/1980 Japan .

OTHER PUBLICATIONS

Emura Junro, "Operating System e no Kozoteki Approach (Ge)", Fifth Edition, Jul. 10, 1982, Nippon Computer Kyokai.

Turbo Pascal Reference Manual (Chapter 18, Overlay System).

International Search Report, completed Jun. 13, 1985 by the Japanese Patent Office.

Primary Examiner—Jerry Smith
Assistant Examiner—Allen MacDonald
Attorney, Agent, or Firm—Staas & Halsey

[57] ABSTRACT

A numerical control method of a numerical control unit according to the present invention includes automatically accessing external memory means 2—2 in a case where a desired NC program does not exist in an internal memory (2—2), reading the desired NC program, which is stored in the external memory means (4), into the internal memory (4), and executing the desired NC program. Accordingly, the operator need not go to the trouble of manually searching for a desired NC program and manually storing the program in the internal memory.

9 Claims, 3 Drawing Sheets

```
FILE  1   NC  PROGRAM      0  0  100
FILE  2   NC  PROGRAM      0  0  200
  ⋮          ⋮
FILE  n-1 NC  PROGRAM      0  0  600
FILE  n   NC  PROGRAM      0  0  700
```

NUMERICAL CONTROL METHOD

FIELD OF THE INVENTION

This invention relates to a numerical control method for numerically controlling a machine tool or the like and, more particularly, to a numerical control method adapted for automatic loading of a numerical control (NC) program.

DESCRIPTION OF THE RELATED ART

FIG. 4 is a block diagram illustrating the essentials of a numerical control system. A conventional control system will now be described based on this drawing. An NC machine is controlled by an NC unit. The NC unit selects the required NC program from among a plurality of NC programs read into an internal memory of the NC unit from an external memory device such as a bubble cassette, NC tape or host computer, and the NC unit controls the operation of the NC machine while reading this program out of the internal memory. The drive of the NC machine is equipped with a drive section of a table, tool rest and the like, and with a control section for controlling spindle rotation on/off and the like, relay operation and sequence operation. The NC unit performs automatic monitoring and adaptive control of the NC machine. Specifically, status information such as workpiece dimensions and tool wear is fed back from the NC machine and appropriate control is carried out based on the feedback information.

When it is attempted to execute, e.g., a series of NC programs in such a numerical control system, conventionally the first step is for the operator to designate the number of a program. When this is done, the NC unit performs a search to determine whether or not the designated NC program is present in the internal memory. If the number does not exist, the NC unit causes an error to be displayed. Thus, the conventional control method is disadvantageous in that when a desired NC program does not exist in the internal memory of the NC unit, an alarm (error display) is generated and the operator must take measures to manually store the desired NC program in the internal memory. In other words, irrespective of the fact that the NC unit has an internal memory and a bubble cassette, paper tape reader or host computer is provided as external memory means, a problem encountered is that a method of having these units cooperate with and back up the internal memory is inadequate. There is also a need to expand the function of the internal memory.

SUMMARY OF THE INVENTION

An object of the present invention is to provide a numerical control method in order to solve the foregoing problems, which method seeks to achieve cooperation between an internal memory of an NC unit and external memory means and to expand the function of the internal memory.

According to the present invention, there is provided a numerical control method of a numerical control unit having an internal memory for storing an NC program and external memory means, the numerical control unit executing an NC program in the internal memory designated by a program selection signal from external selection means. The numerical control method includes automatically searching the internal memory for an NC program designated by the program selection signal, automatically accessing the external memory means in a case where the designated NC program does not exist in the internal memory and, in that case where the designated NC program exists in the external memory means, automatically deleting the NC program in the internal memory, automatically reading the designated NC program into the internal memory, and executing the NC program.

By providing the present invention, a desired NC program can be executed even if the NC program does not exist in the internal memory of the numerical control unit, this being accomplished by automatically accessing the external memory means and reading the desired NC program, which is stored in the external memory means, into the internal memory. Accordingly, the operator need not perform a troublesome operation, economy is improved by reducing labor costs and production efficiency is raised by automation. Further, according to the present invention, even though the internal memory has a small capacity, achieving cooperation between the external memory means and the internal memory is functionally equivalent to physically increasing the capacity of the internal memory. In other words, the present invention has the effect of essentially expanding the function of the internal memory.

DESCRIPTION OF THE PREFERRED EMBODIMENTS

An embodiment of the present invention will now be described in detail in conjunction with the drawings.

Figure 1:
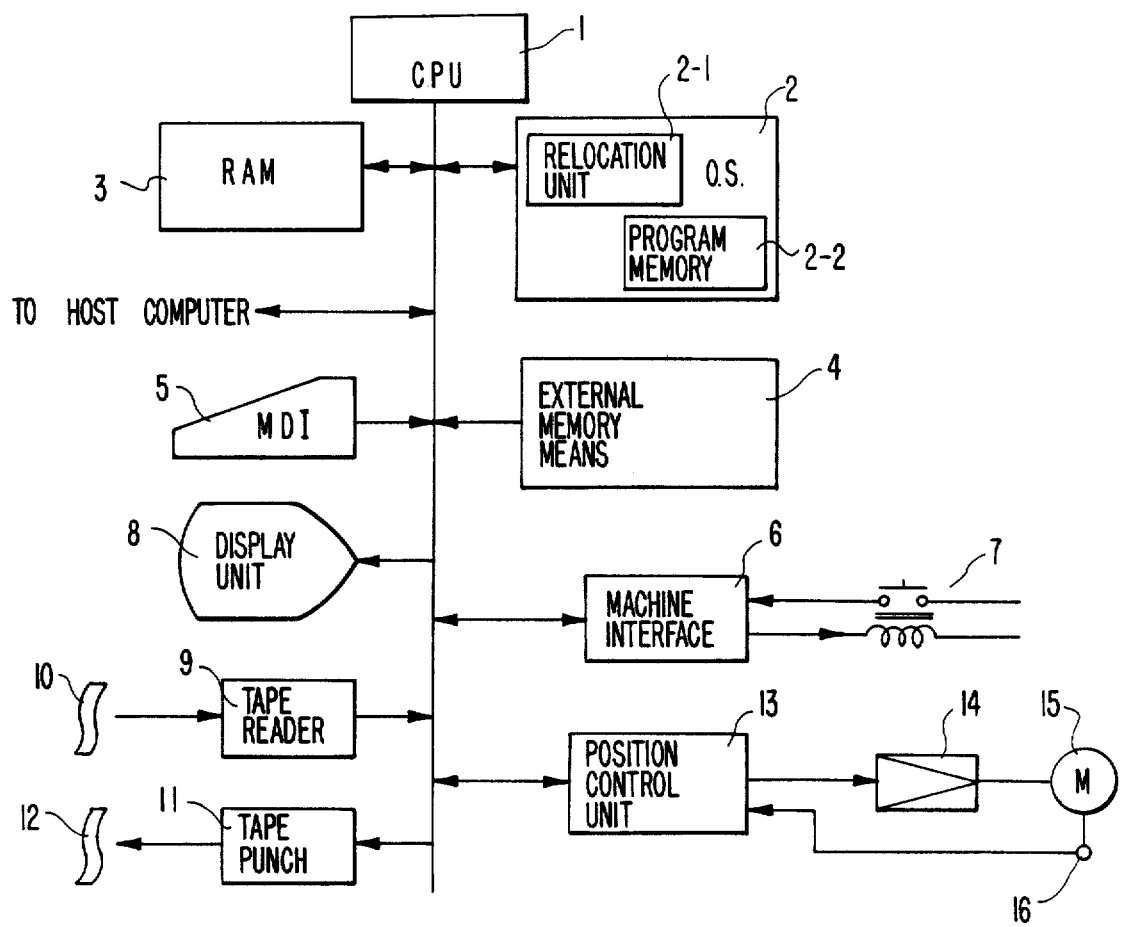
FIG. 1 is a block diagram of a numerical control unit capable of performing a numerical control method embodying the present invention.
Figure 4:
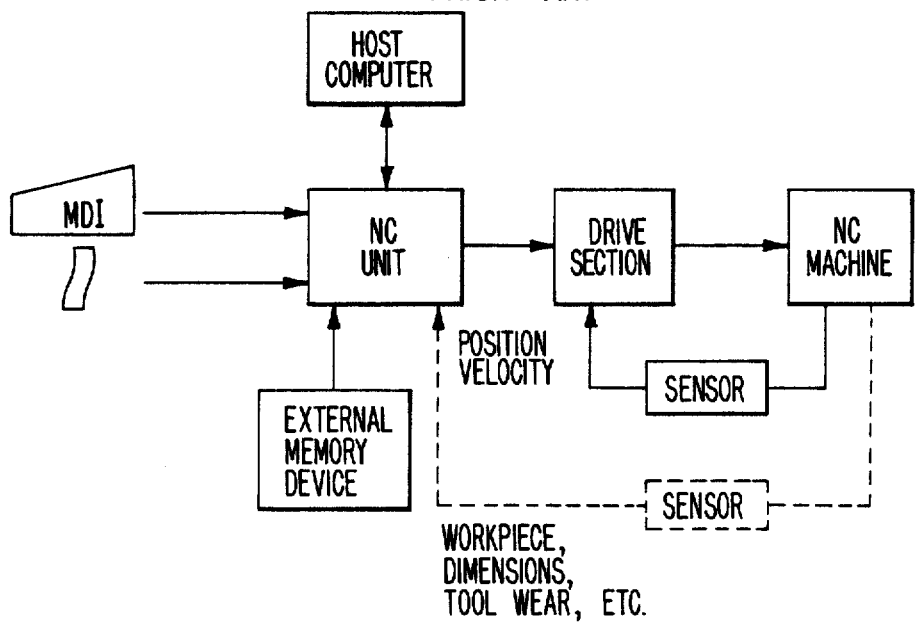
FIG. 4 is a block diagram showing the essentials of a conventional numerical control system.

FIG. 1 is a block diagram showing the essentials of a numerical control method embodying the present invention. In the FIG. 1, numeral 1 denotes a processor (CPU) for executing numerical control processing based on a basic control program and a machining program. Numeral 2 denotes an operating system (O.S.) equipped with a relocation unit 2-1 and a program memory 2-2. Numeral 3 designates a random-access memory (RAM) storing workpiece data and the like. Numeral 5 represents a manual data input unit (MDI) for entering a program selection signal and the like. Shown at numeral 8 is a display unit. The MDI 5 and display unit 8 ordinarily are arranged in integrated form. Numeral 9 denotes a data memory for reading machining data from a punched tape 10 of NC data. Numeral 11 denotes a tape puncher for punching NC data, which is obtained from the NC unit, into an NC tape 12. Numeral 13 denotes a position control unit of a servomotor 15, 14 a servoamplifier, 15 a servomotor, and 16 a sensor for obtaining position information fed back to the position control unit 13. Numeral 6 represents an interface interconnecting the NC unit and a magnetics control circuit 7.

Figure 2:
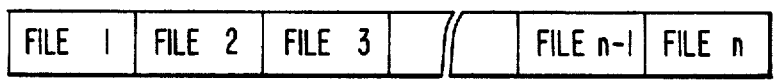
FIG. 2 is an explanatory view illustrating the relationship between files and cassettes in a bubble cassette serving as external memory means.
Figure 2:
Figure 2:
Figure 2:

FIG. 2 is a view for describing the relationship between cassettes and files in a bubble cassette used as an external memory. A cassette can be used to store a file. The term "file" as used herein refers to a unit of data input or output between the NC unit and a cassette by a single input/output operation on the NC unit side. The files are numbered starting with 1 for the first file, 2, 3, 4 ... and so on. This is followed by establishing correspondence between the files and the data in the cassette, based on the file numbers. For example, correspondence is established between NC program O0100 and file 1, NC program O0200 and file 2, ... NC program O0600 and file n−1.

The relationship between such files and cassettes will now be described. As an example, a first cassette includes file 1, file 2, ... file E−1 and E; a second cassette includes file E+1, file E+2, ..., file K−1, and file K; and an M-th cassette includes file K+1, file K+2, ..., file n−1, and file n. It is permissible for one file to be arranged to extend over a cassette.

Figure 3:
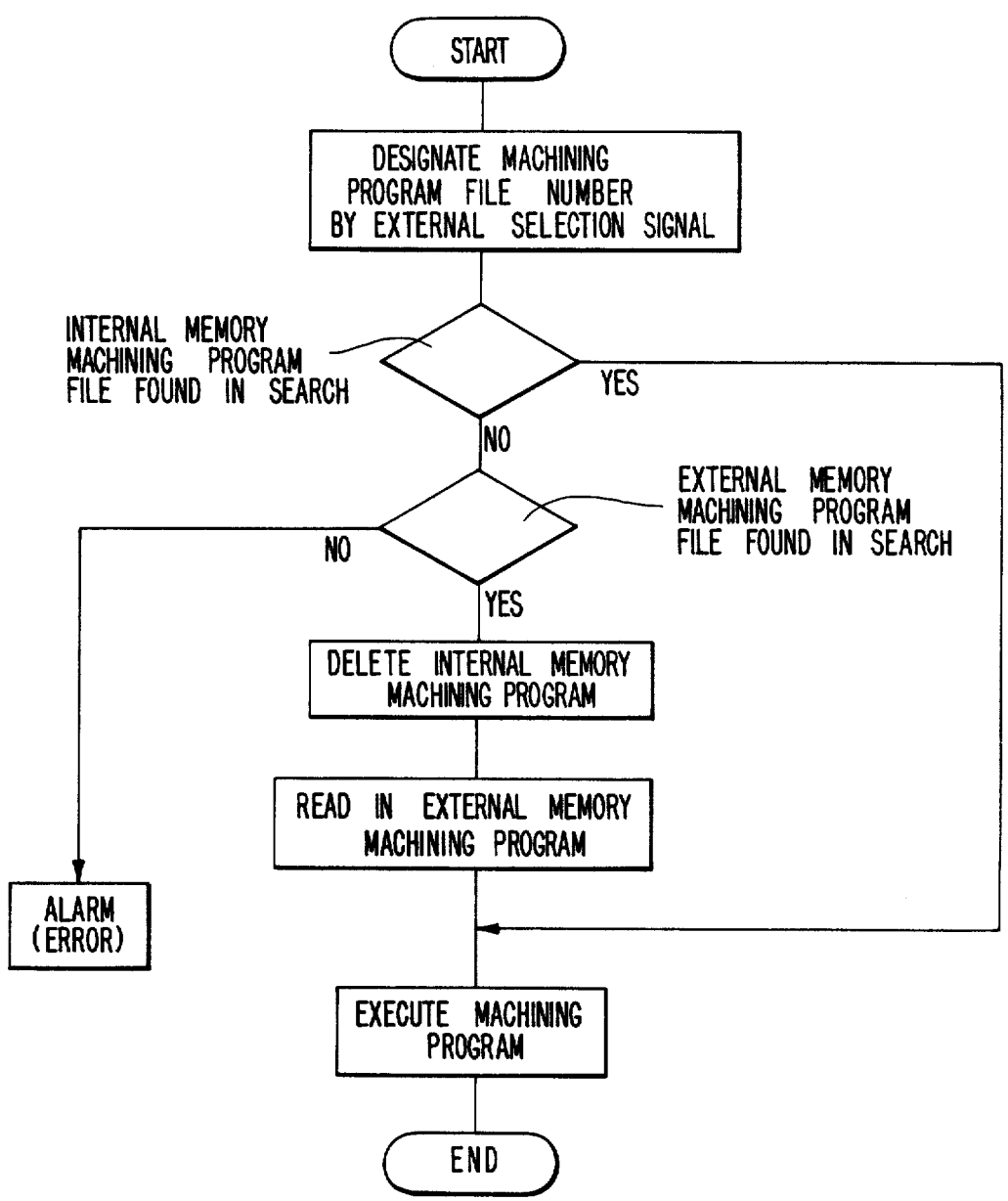
FIG. 3 is a flowchart showing the automatic loading of an NC program according to the present invention.

FIG. 3 is a flowchart showing the automatic loading of an NC program in accordance with the present invention. The present invention will now be described on the basis of the flowchart in FIG. 3.

In a case where a workpiece is to be machined by using a series of NC programs, the first step is for the operator to designate an NC program number by an external selection signal. The external selection signal is obtained by operating the manual data input unit (MDI) 5. In response to designation of an NC program file number, the processor (CPU) 1 executes a search of the internal NC program file stored in the internal program memory 2-2 built in the operating system (O.S.) 2 of the NC unit. If the result of the search is that the desired file is absent, the processor automatically accesses the external memory means 4 and executes a search of NC program files in the external memory. If the result is that the desired file is present in the external memory means 4 the processor deletes the NC program in the internal memory. When the deletion has been made, the processor reads the NC program from the external memory into the internal program memory 2-2. When the reading in of the program ends, the processor (CPU) 1 executes the desired NC program. Note that if the desired NC program is present in the internal program memory 2-2 when the internal program memory 2-2 is searched, the processor (CPU) 1 executes the NC program immediately. Further, if the result of accessing the external memory means 4 is that it does not contain the desired NC program, the processor (CPU) 1 executes an alarm (to display an error). Control between the internal program memory 2-2 and the external memory means 4 is executed by the relocation unit 2-1 in the operating system 2.

In the illustrated embodiment, a bubble cassette is described as being the external memory means. However, a data reader or host computer may serve as the external memory means.

Though the present invention has been described in accordance with an embodiment, the invention is not limited solely to the embodiment but can be modified in various ways in accordance with the gist thereof without departing from the scope of the invention.

Thus, as set forth above, the present invention enables a designated NC program to be executed even if the NC program does not exist in an internal memory, this being accomplished by automatically accessing external memory means and reading in the designated NC program from the external memory means. Accordingly, the invention is well-suited for application to a machine tool numerical control system for performing control based on various NC programs.

What is claimed is:

1. A numerical control method of a numerical control unit having an internal memory for storing an NC program, external selection means and external memory means, the numerical control unit executing an executable NC program in the internal memory, the method including the steps of:
   (a) automatically searching the internal memory for a designated NC program designated by a program selection signal from the external selection means;
   (b) automatically accessing the external memory means if the designated NC program is unavailable in the internal memory and the designated NC program exists in the external memory means;
   (c) automatically deleting the executable NC program in the internal memory if step (b) is performed;
   (d) automatically reading the designated NC program into the internal memory from the external memory means after completing step (c); and
   (e) executing the designated NC program stored in the internal memory.

2. A numerical control method according to claim 1, wherein the external memory means is a bubble cassette.

3. A numerical control method according to claim 1, wherein the external memory means is a tape reader.

4. A numerical control method according to claim 1, wherein the external memory means is a host computer.

5. A numerical control unit, comprising:
   external selection means for receiving a selection signal indicating a designated NC program;
   program memory means for storing an executable NC program;
   external memory means for storing and accessing stored NC programs; and
   control means for executing the executable NC program if the executable NC program is the designated NC program, for requesting access to the designated NC program among the stored NC programs in said external memory means if the executable NC program is not the designated NC program, for indicating an error if the designated NC program is not located, and for storing the designated NC program in said program memory means as a new executable NC program if the designated NC program is located.

6. A numerical control unit according to claim 5, wherein said control means comprises:
   a central processing unit, operatively connected to said external selection means, for receiving the selection signal from said external selection means and for supplying the selection signal as a request to execute the designated NC program if available; and
   communication control means, operatively connected to said central processing unit, said external memory means and said program memory means, for controlling communications between said external memory means and program memory means.

7. A numerical control unit according to claim 5, wherein said external memory means comprises a bubble cassette operatively connected to said communication control means.

8. A numerical control unit according to claim 5, wherein said external memory means comprises a tape reader operatively connected to said communication control means.

9. A numerical control unit according to claim 5, wherein said external memory means comprises a host computer operatively connected to said communication control means.

* * * * *